US011983859B2

(12) United States Patent
Maitrejean et al.

(10) Patent No.: US 11,983,859 B2
(45) Date of Patent: May 14, 2024

(54) CORRECTION OF IMAGES (71) Applicant: Smiths Detection France S.A.S., Vitry sur Seine (FR)

(72) Inventors: Serge Maitrejean, Paris (FR); Guillaume Jegou, Cachan (FR); Jean-Michel Faugier, Chevreuse (FR); Cindy Bergerat, Antony (FR)

(73) Assignee: Smiths Detection France S.A.S., Vitry sur Seine (FR)

( * ) Notice: Subject to any disclaimer, the term of this patent is extended or adjusted under 35 U.S.C. 154(b) by 496 days.

(21) Appl. No.: 17/281,819

(22) PCT Filed: Sep. 27, 2019

(86) PCT No.: PCT/GB2019/052737
§ 371 (c)(1),
(2) Date: Mar. 31, 2021

(87) PCT Pub. No.: WO2020/070473
PCT Pub. Date: Apr. 9, 2020

(65) Prior Publication Data
US 2022/0020140 A1 Jan. 20, 2022
US 2023/0109669 A9 Apr. 6, 2023

(30) Foreign Application Priority Data

Oct. 1, 2018 (GB) ..................... 1816014

(51) Int. Cl.
*G06T 7/00* (2017.01)
*G01N 23/04* (2018.01)
(Continued)

(52) U.S. Cl.
CPC .......... *G06T 7/0004* (2013.01); *G01N 23/04* (2013.01); *G01N 23/083* (2013.01); *G01N 23/10* (2013.01);
(Continued)

(58) Field of Classification Search
CPC ................... G06T 7/0004; G06T 5/006; G06T 2207/10116; G06T 2207/20212;
(Continued)

(56) References Cited

U.S. PATENT DOCUMENTS

2008/0298545 A1   12/2008   Bueno et al.
2008/0298546 A1*  12/2008   Bueno ............... G01V 5/0025
                                              250/359.1
(Continued)

FOREIGN PATENT DOCUMENTS

CN   108553121 A   9/2018
JP   2002010039 A   1/2002
(Continued)

OTHER PUBLICATIONS

Thomas W Rogers et al., "Automated X-ray Image Analysis for Cargo Security: Critical Review and Future Promise", arxiv.org, Cornell University Library, 201 Olin Library Cornell University Ithica, NY 14853, Aug. 3, 2016, XP080717884, the whole document.
(Continued)

*Primary Examiner* — Bobbak Safaipour
*Assistant Examiner* — Jongbong Nah
(74) *Attorney, Agent, or Firm* — Armstrong Teasdale LLP (57) ABSTRACT

A method for inspecting cargo with is disclosed. The method includes scanning the cargo with a matrix including at least two rows of detectors, wherein each zone of the cargo irradiated by a first X ray pulse is irradiated by at least one second X ray pulse, and a radiation corresponding to the first X ray pulse is detected by a first row of the matrix, and a radiation corresponding to the at least one second pulse is detected by at least one second row of the matrix, generating a first image of the cargo and at least one second image of the cargo, determining, for each zone of the cargo irradiated,
(Continued)

a local mutual parasitic displacement between the cargo and the matrix, determining a total mutual parasitic displacement, and generating a corrected image of the cargo without the mutual parasitic displacement.

20 Claims, 8 Drawing Sheets (51) Int. Cl.
- *G01N 23/083* (2018.01)
- *G01N 23/10* (2018.01)
- *G06T 5/00* (2006.01)

(52) U.S. Cl.
CPC .......... *G06T 5/006* (2013.01); *G01N 2223/04* (2013.01); *G01N 2223/33* (2013.01); *G01N 2223/401* (2013.01); *G06T 2207/10116* (2013.01); *G06T 2207/20212* (2013.01)

(58) Field of Classification Search
CPC ........ G01N 23/04; G01N 23/08; G01N 23/10; G01N 2223/04; G01N 2223/33; G01N 2223/401

See application file for complete search history.

(56) References Cited

U.S. PATENT DOCUMENTS

| | | | |
|---|---|---|---|
| 2012/0148020 A1* | 6/2012 | Arroyo, Jr. | G01V 5/0016 378/57 |
| 2013/0156156 A1 | 6/2013 | Roe et al. | |
| 2013/0328919 A1 | 12/2013 | Holt | |
| 2015/0325401 A1* | 11/2015 | Langeveld | G01V 5/0016 378/57 |

FOREIGN PATENT DOCUMENTS

| | | |
|---|---|---|
| WO | 2016082006 A1 | 6/2016 |
| WO | 2017205914 A1 | 12/2017 |

OTHER PUBLICATIONS

UK Search Report, Application No. GB1816014.3, dated Mar. 28, 2019, 3 pgs.

PCT International Search Report and Written Opinion, Application No. PCT/GB2019/052737, dated Nov. 18, 2019, 2 pgs.

\* cited by examiner

CORRECTION OF IMAGES

CROSS-REFERENCE TO RELATED APPLICATIONS

This patent application is a National Stage Entry of PCT/GB2019/052737 filed on Sep. 27, 2019, which claims priority to GB Application No. 1816014.3 filed on Oct. 1, 2018, the disclosures of which are hereby incorporated by reference herein in their entirety as part of the present application.

BACKGROUND

The disclosure relates but is not limited to a method for inspecting cargo with X-rays. The disclosure also relates but is not limited to a corresponding inspection system and a corresponding computer product or a computer program.

Inspecting cargo with X-rays may be performed by scanning the cargo by mutually displacing the cargo and a scanner including a detector, with a mutual scanning displacement, and detecting, with the scanner, radiation generated by a plurality of successive X ray pulses irradiating the cargo during the mutual scanning displacement.

In a mobile mode, mutually displacing the cargo and the scanner includes maintaining the cargo static with respect to a ground and displacing the scanner with respect to the ground during the scanning displacement.

In a pass-through or portal mode, mutually displacing the cargo and the scanner includes maintaining the scanner static with respect to a ground and displacing the cargo with respect to the ground during the scanning displacement.

In the mobile mode, even on flat grounds, the detector may have vertical and longitudinal (e.g. in a direction of the mutual scanning displacement) parasitic displacements (e.g. such as vertical displacements, rotation displacement and/or pendulum displacements) which may cause image artefacts and degrade image quality. The parasitic displacements of the detector may generate waves such that most of real straight lines may not appear as straight lines on images generated based on the inspection.

In the pass-through mode the speed of the cargo may be irregular which may cause also image artefacts and degrade image quality. Inhomogeneity of the speed may cause horizontal stretches or compressions on the image. These artefacts behave a local horizontal parasitic displacements.

BRIEF DESCRIPTION

Embodiments of the disclosure provide a method for inspecting cargo. The inspection of the cargo involves scanning the cargo using a scanner including a matrix of detectors including at least two rows of detectors. The scanner may also include, in some examples, a source of radiation. The scanning also involves mutually displacing the cargo and the matrix. During the scanning, zones of the cargo are irradiated by several X ray pulses and the corresponding radiation is detected by several rows. The method also includes generating an image of the cargo for each row of detectors, and determining a local mutual parasitic displacement (e.g. any local discrepancy between the expected mutual scanning displacement and the actual mutual scanning displacement) between corresponding pixels of the generated images. The method also includes generating a corrected image using one or more of the generated images without a total mutual parasitic displacement corresponding to a sum of the local mutual parasitic displacements. The mutual parasitic displacements may correspond to parasitic movements of the matrix, e.g. such as vertical displacements, rotation displacement and/or pendulum displacements when the matrix is mounted on the boom of a mobile inspection system, or to parasitic movements of the cargo, e.g. speed inhomogeneity of the cargo passing in front of the matrix.

Embodiments of the disclosure may enable improvement of the quality of an image generated based on the inspection. Embodiments of the disclosure may not involve an expensive and heavy mechanical compensation device dedicated to inhibit (e.g. reduce) parasitic movements of the matrix (e.g. when the matrix is mounted on a boom of an inspection system). Embodiments of the disclosure may not involve image processing based on prior hypotheses which may not be true or affect other parts of the images which do not require correction.

Aspects and embodiments of the disclosure are set out in the appended claims. These and other aspects and embodiments of the disclosure are also described herein.

BRIEF DESCRIPTION OF DRAWINGS

Embodiments of the present disclosure will now be described, by way of example, with reference to the accompanying drawings, in which.

In the figures, similar elements bear identical numerical references.

DETAILED DESCRIPTION

Overview

Embodiments of the disclosure provide a method for inspecting cargo. The inspection of the cargo involves scanning the cargo using a scanner including a matrix of detectors including at least two rows of detectors. The scanner may also include, in some examples, a source of radiation. The scanning also involves mutually displacing the cargo and the matrix. During the scanning, zones of the cargo are irradiated by several X ray pulses and the corresponding radiation is detected by several rows. The method also includes generating an image of the cargo for each row of detectors, and determining a local mutual parasitic displacement (e.g. any local discrepancy between the expected mutual scanning displacement and the actual mutual scanning displacement) between corresponding pixels of the generated images. The method also includes generating a corrected image using one or more of the generated images without a total mutual parasitic displacement corresponding to a sum of the local mutual parasitic displacements. The mutual parasitic displacements may correspond to parasitic movements of the matrix, e.g. such as vertical displacements, rotation displacement and/or pendulum displacements when the matrix is mounted on the boom of a mobile inspection system, or to parasitic movements of the cargo, e.g. speed inhomogeneity of the cargo passing in front of the matrix.

Embodiments of the disclosure may enable improvement of the quality of an image generated based on the inspection. Embodiments of the disclosure may not involve an expensive and heavy mechanical compensation device dedicated to inhibit (e.g. reduce) parasitic movements of the matrix (e.g. when the matrix is mounted on a boom of an inspection system). Embodiments of the disclosure may not involve image processing based on prior hypotheses which may not be true or affect other parts of the images which do not require correction.

Details Description of Example Embodiments

Figure 1:
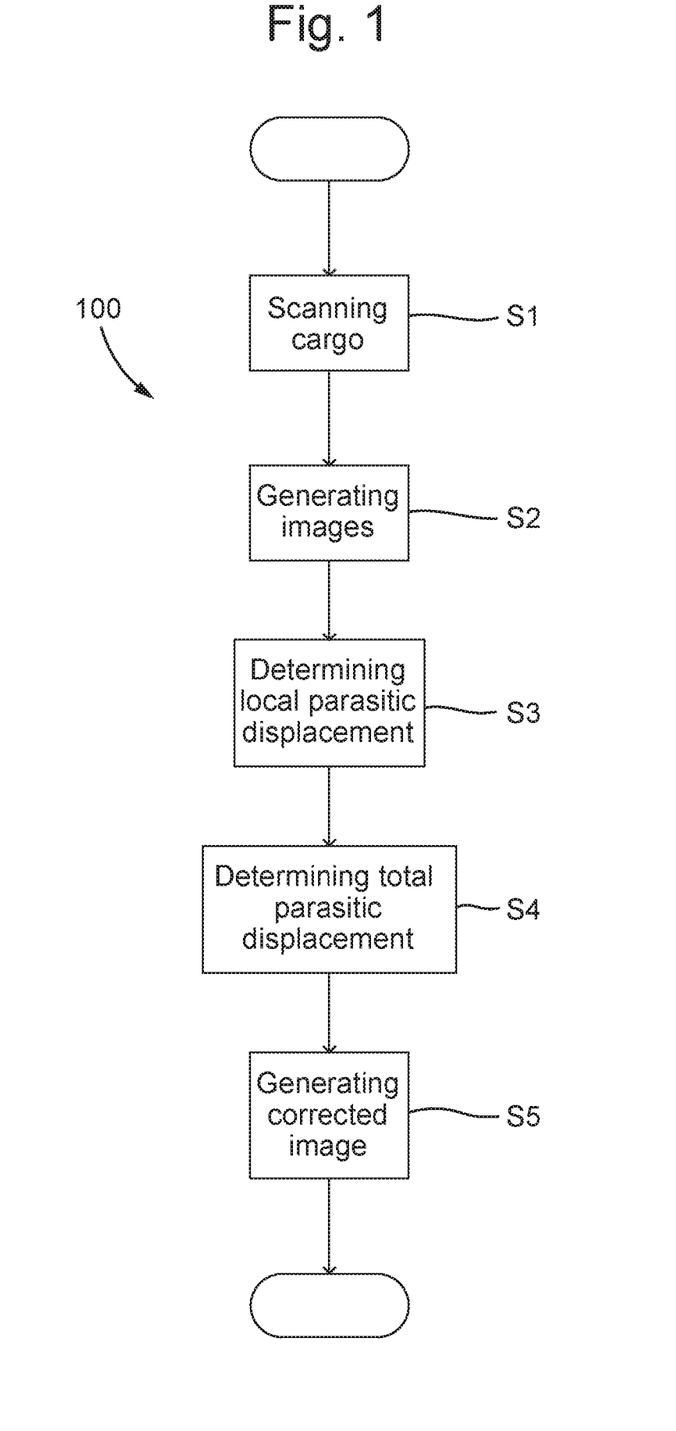
FIG. 1 shows a flow chart illustrating an example method according to the disclosure.
Figure 2:
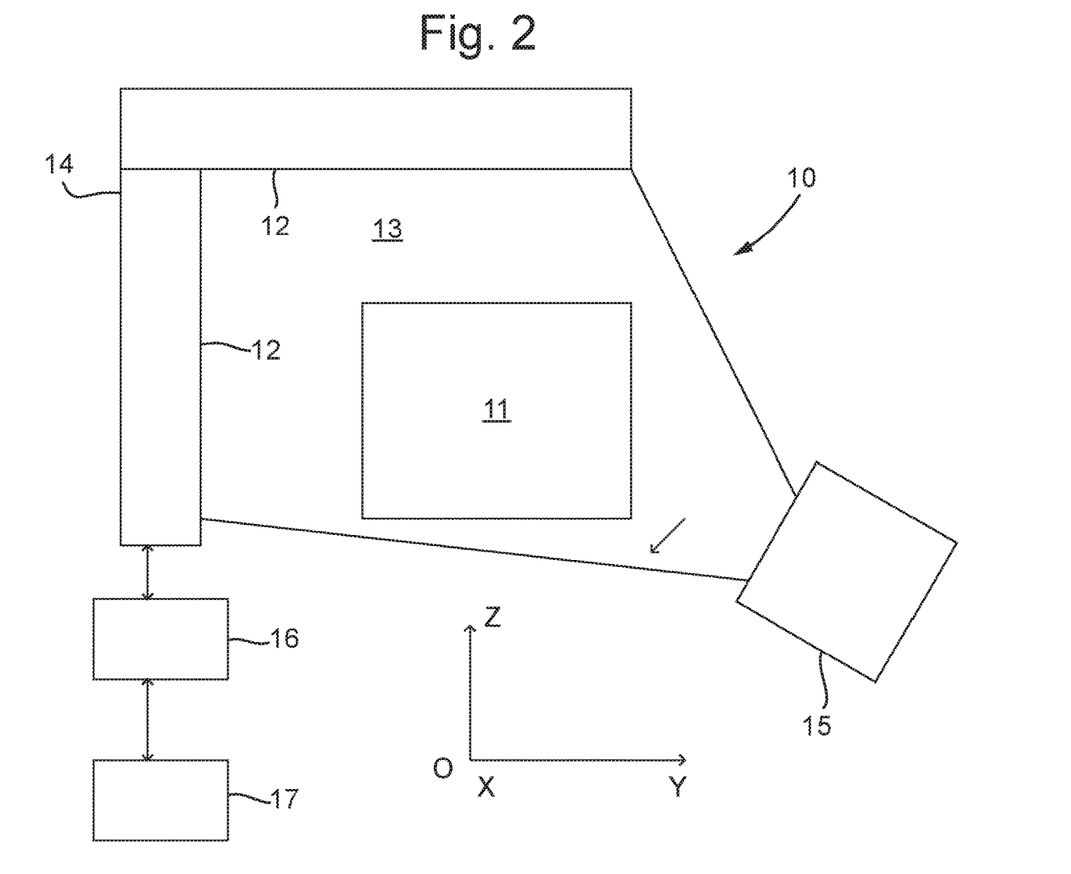
FIG. 2 schematically illustrates an example system configured to implement, at least partly, the example method of FIG. 1.
Figure 3:
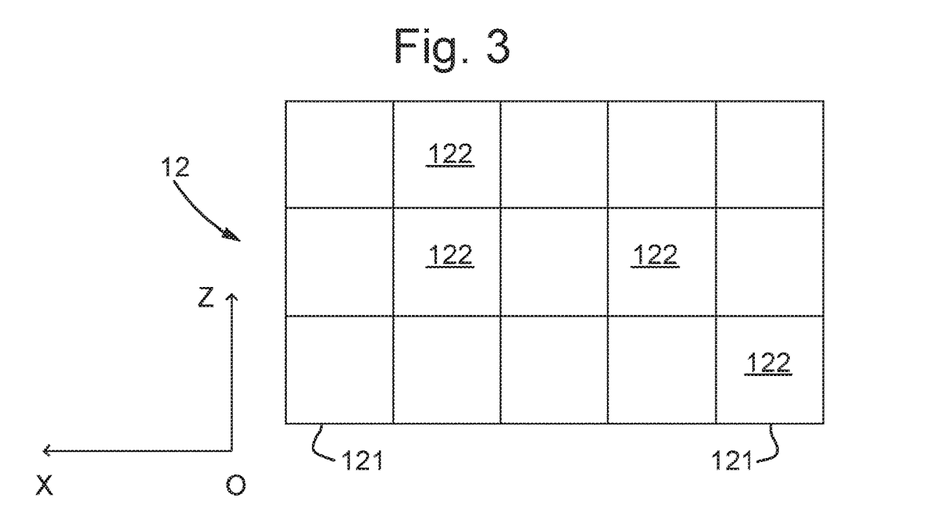
FIG. 3 illustrates an example matrix according to the disclosure.

FIG. 1 shows a flow chart illustrating an example method 100 according to the disclosure. The method 100 is illustrated in FIG. 1 in connection with FIG. 2, which shows an inspection system 10 for inspecting cargo 11 with X-rays which may be used to perform, at least partly, the method 100. FIG. 3 schematically show a detail of a matrix 12 of the system 10. In FIG. 2, the inspection system 10 includes a boom 14 on which the matrix 12 may be mounted. In the example illustrated in FIGS. 2 and 3, the matrix 12 includes, amongst other conventional electrical elements, radiation detection lines, such as X-ray detection lines.

As shown in FIG. 1 and discussed in more detail below, the method 100 may include:
- scanning, at S1, the cargo 11 with the matrix 12 including at least two rows 121 of detectors 122;
- generating, at S2, a first image of the cargo 11 for the first row 121-1 of the matrix 12 and at least one second image of the cargo for the at least one second row 121-2 of the matrix 12;
- determining, at S3, a local mutual parasitic displacement between the cargo 11 and the matrix 12, e.g. by using the at least two images;
- determining, at S4, a total mutual parasitic displacement, by summing the determined local mutual displacements for the irradiated zones; and
- generating, at S5, a corrected image of the cargo, based on the determined total mutual parasitic displacement.

As illustrated in FIG. 1, the method 100 may include scanning, at S1, the cargo 11 with the matrix 12 including at least two rows 121 of detectors 122.

In some examples, the scanning at S1 may include:
- mutually displacing the cargo 11 and the matrix 12 with a mutual scanning displacement SD (shown for example in FIG. 4), and
- detecting, with the matrix 12, radiation 13 generated by a plurality of successive X ray pulses irradiating the cargo 11, during the mutual scanning displacement SD.

The radiation 13 may be generated by an X-ray source 15, which may be, in some examples, rigidly connected to the matrix 12. The source 15 may be moved with the matrix 12.

In the example illustrated in FIG. 2, the inspection system 10 may be mobile and may be transported from a location to another location (the system 10 may include an automotive vehicle). Alternatively or additionally, the inspection system may be static with respect to the ground and cannot be displaced.

In the example illustrated in FIG. 2, the system 10 may also include an electro-hydraulic boom 14 which can operate in a retracted position in a transport mode (not illustrated in the Figures) and in an inspection position (FIG. 2). The boom 14 may be operated by hydraulic activators (such as hydraulic cylinders).

The matrix 12 may be mounted on the boom 14, facing the source 15 on the other side of the cargo 11.

In some examples, scanning the cargo at S1 may include scanning the cargo 11 in a mobile mode. In that case, mutually displacing the cargo 11 and the matrix 12 may include maintaining the cargo static with respect to the ground and displacing the matrix 12 with respect to the ground during the scanning displacement SD. In some examples, scanning the cargo may include mounting the matrix 12 on the boom 14 of the mobile inspection system 10. In that case, generating at S5 the corrected image may include correcting boom movements artefacts generated in the mobile mode by movements of the boom 14 on which the matrix 12 is mounted (such as parasitic displacement such as vertical displacements, rotation displacement and/or pendulum displacements).

Alternatively or additionally, scanning at S1 the cargo 11 may include scanning the cargo 11 in a pass-through mode. In that case, mutually displacing the cargo 11 and the matrix 12 may include maintaining the matrix 12 static with respect to the ground and displacing the cargo 11 with respect to the ground during the scanning displacement SD. In some examples, scanning the cargo 11 includes mounting the matrix 12 on the boom 14 of a static inspection system 10. In that case, generating at S5 the corrected image may include correcting cargo speed inhomogeneity generated in the pass-through mode (such as speed inhomogeneity of the cargo 11).

In the present specification, all of the figures are depicting the case of vertical boom movements, e.g. in the mobile mode. It should be understood that all the explanations would remain similar for speed inhomogeneity, e.g. in the pass-through mode, with reference to similar figures with horizontal parasitic displacements instead of vertical parasitic displacements.

Figure 4:
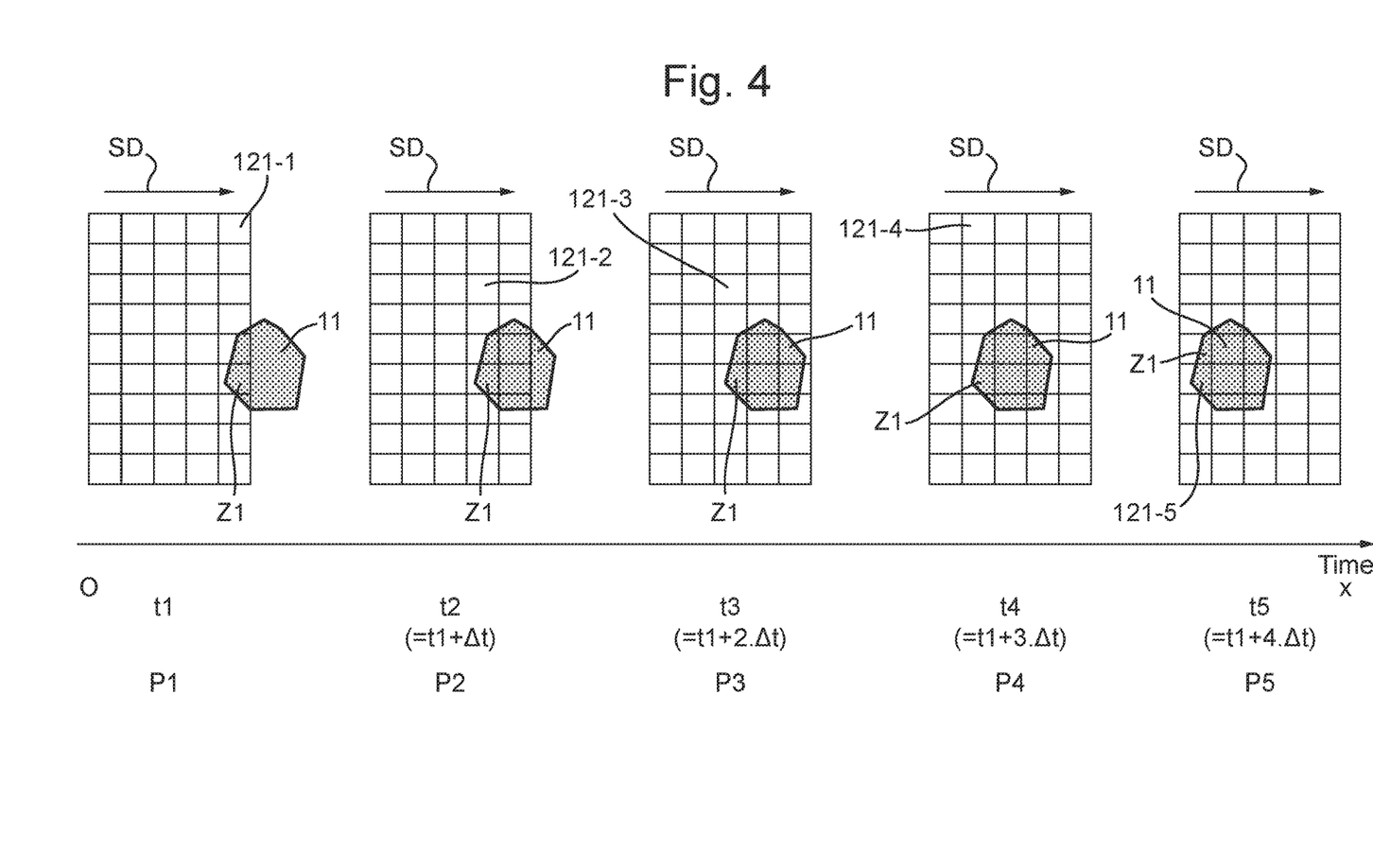
FIG. 4 schematically illustrates an example zone Z1 of the cargo irradiated by a first X ray pulse P1 and by at least one second X ray pulse, i.e. pulses P2, P3, P4 and P5.

As illustrated in FIG. 4, in some examples, each zone $Z_i$ of the cargo 11 irradiated by a first X ray pulse $P_i$ is irradiated by at least one second X ray pulse $P_j$ ($j \neq i$).

Alternatively or additionally, as illustrated in FIG. 4, a radiation 13 corresponding to the first X ray pulse $P_i$ is detected by a first row 121-$i$ of the matrix 12, and a radiation 13 corresponding to the at least one second pulse $P_j$ ($j \neq i$) is detected by at least one second row 121-$j$ ($j \neq i$) of the matrix 12.

In examples of the disclosure, a speed of the mutual scanning displacement SD is such that between two pulses $P_i$ and $P_{i+1}$, a mutual displacement of the cargo 11 with respect to the matrix 12 may be lower than a width of a row 121-$i$ of the matrix 12 (e.g. around 2 mm, but other dimensions are envisaged). In some examples, any zone $Z_i$ of the cargo 11 irradiated by a pulse $P_i$ will be detected by all of the rows 121-$i$ of the matrix 12. As illustrated in FIG. 4, the matrix 12 may oversample the cargo 11. In some examples, a zone Z1 of the cargo 11 appears several times, on different rows (e.g. 121-1, 121-2, 121-3, 121-4 and 121-5 in the example of FIG. 4).

As illustrated in FIG. 1, the method 100 may also include generating, at S2, a first image of the cargo 11 for the first row 121-$i$ of the matrix 12 and at least one second image of the cargo 11 for the at least one second row 121-$j$ ($j \neq i$) of the matrix 12. In some examples, from data provided by the matrix 12, an image may be generated for each row 121 of the matrix 12.

In some examples, each image includes pixels corresponding to the row 121-$i$ of detectors 122 for each X ray pulse Pi.

In some examples, as illustrated in FIGS. 5A and 5B, there may be a local mutual parasitic displacement occurring between the first pulse Pi and the at least one second X ray pulse Pj ($j \neq i$). It should be understood that the local mutual parasitic displacement is other than the mutual scanning displacement SD (as shown in FIG. 4) occurring between the first pulse Pi and at least one second pulse Pj ($j \neq i$).

In some examples, the mutual scanning displacement SD occurring between the first pulse Pi and at least one second pulse Pj ($j \neq i$) may correspond to a case where a movement of the matrix 12 may only be a translation at a constant speed along a horizontal axis (FIG. 4). In such an example, the generated images may only be translated between them, the translation corresponding to a distance travelled by the matrix 12 with respect to the cargo 11 between two pulses Pi and Pj ($j \neq i$).

Figure 5:
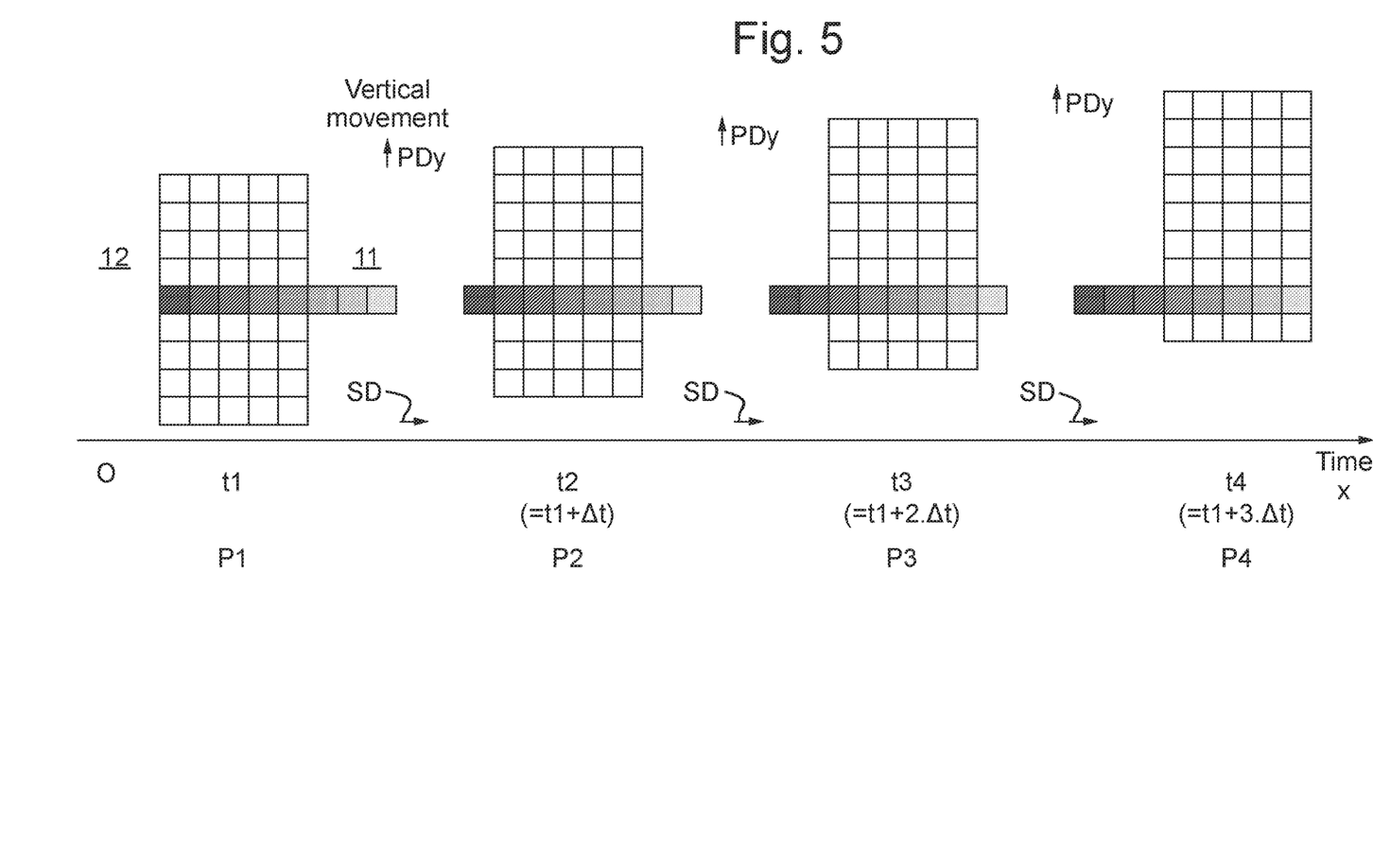
FIG. 5 schematically illustrates an example mutual parasitic vertical displacement PDy, superimposed to a mutual scanning displacement SD.

As illustrated in FIG. 5, the matrix 12 may have a mutual parasitic displacement PD (e.g. when the matrix 12 is mounted on the boom 14 of an inspection system 10), superimposed to the mutual scanning displacement SD. In the example of FIG. 5, the mutual parasitic displacement PD may include a vertical movement PDy. Other examples of mutual parasitic displacements may include rotation displacement and/or pendulum displacements, and/or speed inhomogeneity.

For the sake of clarity, in FIG. 5 the vertical parasitic movement PDy and the scanning displacement SD between two pulses Pi are exactly of one pixel.

In some examples, the speed of the vertical parasitic movement PDy may be considered as a constant in the duration of the four pulses P1, P2, P3 and P4 illustrated in FIG. 5, because most parasitic movements have frequencies with typical periods around one second (in the range 0.5 to 1.5 seconds, depending on the inspection system 10). The frequency of the pulses Pi may be between e.g. 100 Hz and 300 Hz, and may be typically 200 Hz. In a case where the frequency is 200 Hz, there are about 200 pulses during one mechanical oscillation of the matrix 12.

Figure 6A:
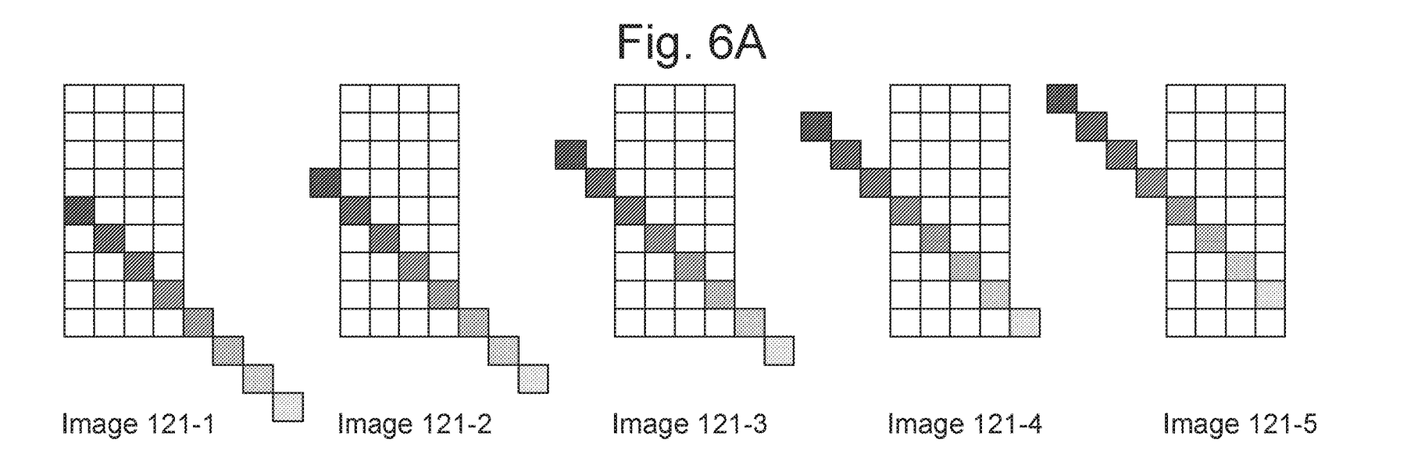
FIGS. 6A and 6B schematically illustrate examples of simplified images for different rows, where FIG. 6A schematically illustrates images without correction for the scanning displacement SD, and FIG. 6B schematically illustrates images with correction for the scanning displacement SD.
Figure 6B:
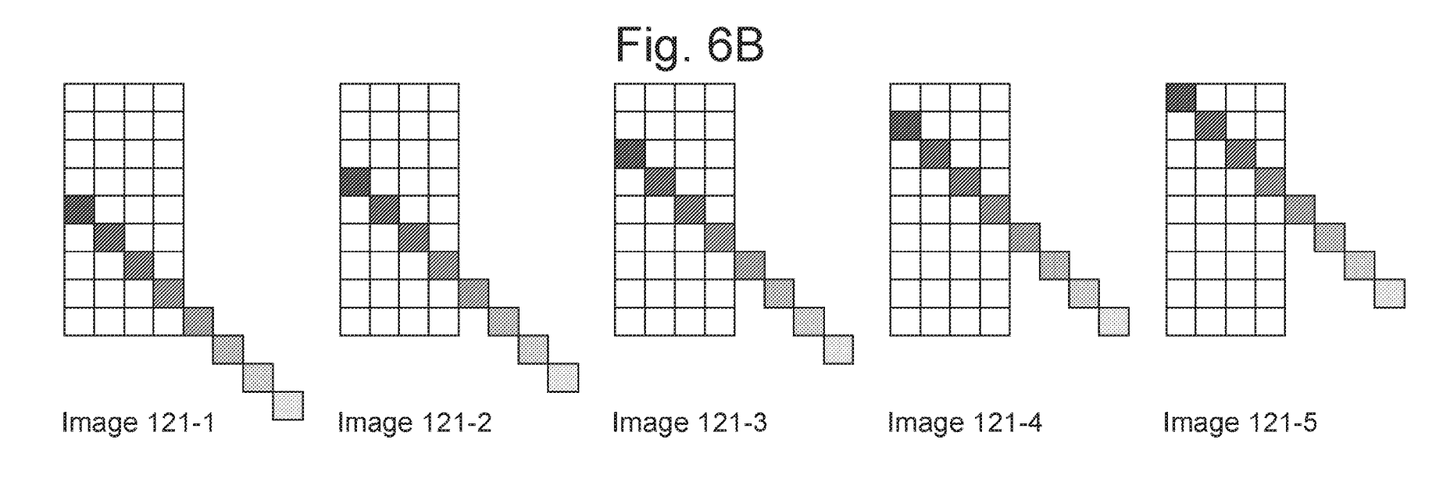

FIGS. 6A and 6B schematically illustrate examples of simplified images for different rows 121-$i$. FIG. 6A schematically illustrates images without correction for the scanning displacement SD. The scanning displacement SD is known and may thus be corrected. FIG. 6B schematically illustrates images with correction for the scanning displacement SD.

It should be understood that because the speed is assumed to be a constant in the example of FIGS. 6A and 6B, images of the cargo 11 for the different rows 121-$i$ are locally similar. It means that, locally, an image may be transformed into another image by a translation vector. The variation of the translation vector in time (i.e. along the horizontal direction) and/or vertically depends on the nature of the parasitic displacement (e.g. vertical, rotation and/or pendulum).

The method 100 may thus further include, determining, at S3, for each zone Zi of the cargo 11 irradiated by the first X ray pulse Pi and by the at least one second X ray pulse Pj ($j \neq i$), a local mutual parasitic displacement between the cargo 11 and the matrix 12.

It should be understood that all the different images are distorted by the parasitic displacement PD and none of the images may be considered as a reference. However, in some examples, determining at S3 the local mutual parasitic displacement may include determining local mutual displacements between corresponding pixels of the first image and the at least one second image. In some examples, an instantaneous and local displacement vector may be determined and used to correct the parasitic displacements in the images.

The following conventions will be used in the following developments:

$I_1(x,y)$ may be an image that would be acquired by the first row 121-1 if there was no parasitic displacements, $I_n(x,y)$ may be an image that would be acquired by the nth row 121-$n$ if there was no parasitic displacements, x is the horizontal coordinate, i.e. the scanning direction (Ox), and y the vertical direction $$I_n(x,y)=h(x-(n-1)\cdot\Delta,y) \qquad \text{(Eq. 1)}$$

x and y are distances, and $\Delta$ is a distance between two adjacent row 121-$i$ and 121-$i$+1, at the level of the cargo 11.

$(n-1)\cdot\Delta$ is a constant shift in the scanning direction (Ox), and it is known because the scanning speed is known. In some examples, $(n-1)\cdot\Delta$ may be cancelled by shifting horizontally the image (and filling with 0 the missing rows at the extremity of the images). In some examples, $I_n(x,y)$ may be replaced by a translated $I_n(x+(n-1)\Delta,y)$.

The slight stereoscopic effects may also be neglected, and the translated images may be such that:

$$I_n(x,y)=I_1(x,y). \qquad \text{(Eq 1')}$$

$I_n(x,y)$ may be the image acquired with the parasitic displacements. For the first row:

$$I_1(x,y)=I_1(x+\Delta_x(t_1(x),y),y+\Delta_y(t_1(x),y)) \qquad \text{(Eq. 2)}$$

with:

$t_1(x)$ is a time when the first row images coordinate x, and $\Delta_x(t_1(x),y)$ and $\Delta_y(t_1(x),y)$ are respectively the parasitic displacements in x and y due to the matrix mutual movements at time $t_1(x)$.

Equation 2 may be valid for a continuous model (e.g. the image may be a function of a continuous variable). However, cargo images are functions of x and y as discrete variables, and it can be assumed that images of cargo are bandwidth limited and that the pixel size allows a reconstruction of the continuous function, e.g. using the Nyquist-Shannon theorem.

For the nth row, with the constant translation due to scanning SD being suppressed:

$$I_n(x,y)=I_n(x+\Delta_x(t_n(x),y),y+\Delta_y(t_n(x),y))=I_1(x+\Delta_x(t_n(x),y),y+\Delta_y(t_n,y))$$

with:

$t_n(x)$ a time when the nth row images coordinate x, and $\Delta_x(t_n(x),y)$ and $\Delta_y(t_n(x),y)$ are the displacements of the image due to the matrix movements at time $t_n(x)$.

For the sake of clarity, $t_n(x)$ may be used instead of $t1(x)$ for I1 because the images are corrected from constant scanning displacement SD. These instants are separated by $n\delta/v$, v being the scan speed.

Time and mean position (i.e. a position without matrix mutual movement) are proportional (x=vt, with v the scanning speed). It is thus more convenient to remove time and to express Equation 2 as follow $$I_n(x,y)=I_1(x+\Delta_{nx}(x,y), y+\Delta_{ny}(x,y)) \quad \text{(Eq. 3)}$$

The following development will describe how a local displacement vector between any pair of images may be determined.

Figure 7:
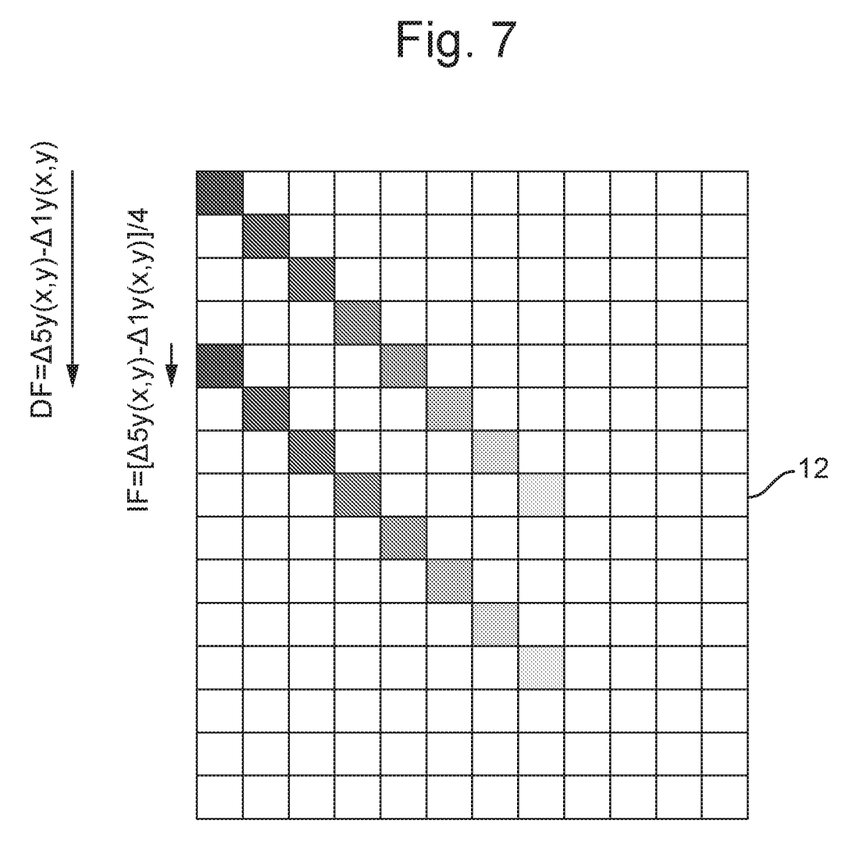
FIG. 7 schematically illustrates a displacement field between two images coming from two different detection rows (e.g. row 1 and row 5) and an estimation of the instantaneous displacement field.

FIG. 7 schematically illustrates a displacement field DF between two images coming from two different detection rows (e.g. row 121-1 and row 121-5) and an estimation of the instantaneous displacement field. In the context of the disclosure, instantaneous displacement is associated with a displacement between two successive pulses Pi.

As illustrated in FIG. 7, a displacement field DF between two images $I_p(x,y)$ and $I_q(x,y)$, corresponding to row 121-$p$ and 121-$q$ of the matrix 12, may be estimated such that:

$$\Delta_p x(x,y) - \Delta_q x(x,y), \text{ and}$$

$$\Delta_{py}(x,y) - \Delta_{qy}(x,y).$$

With the assumption of constant speed of matrix movements between two rows 121-$i$ and 121-$i$+1, an instantaneous displacement field IF may be determined by dividing the above displacement field by p-q, as illustrated in FIG. 7, with a simple case of only a vertical displacement, using the first row 121-1 and the fifth row 121-5.

As illustrated in FIG. 1, the method 100 may also include determining, at S4, a total mutual parasitic displacement, by summing the determined local mutual displacements for the irradiated zones Zi, from an X ray pulse associated with a start of the scan of the cargo to an X ray pulse associated with an end of the scan of the cargo.

In some examples, the above instantaneous displacement field IF may be used to determine an image distortion as described below.

Figure 8A:
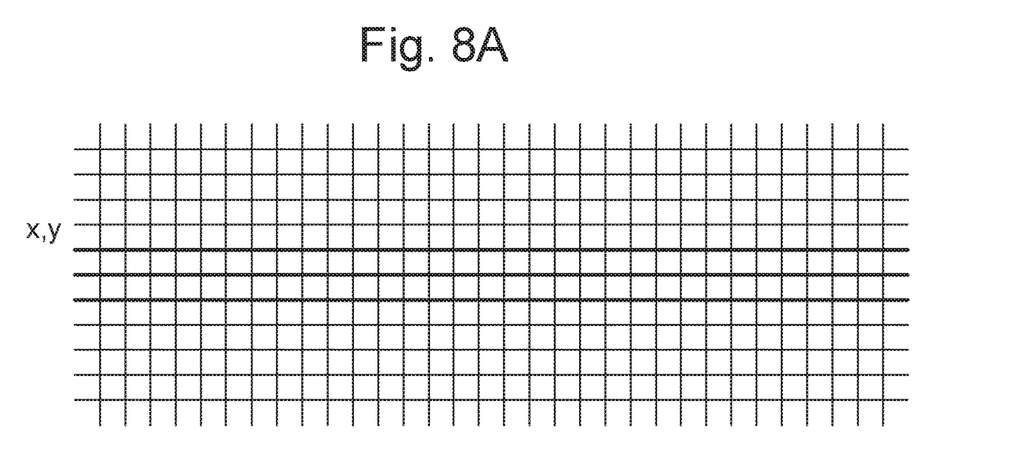
FIG. 8A schematically illustrates coordinates of an acquired image.
Figure 8B:
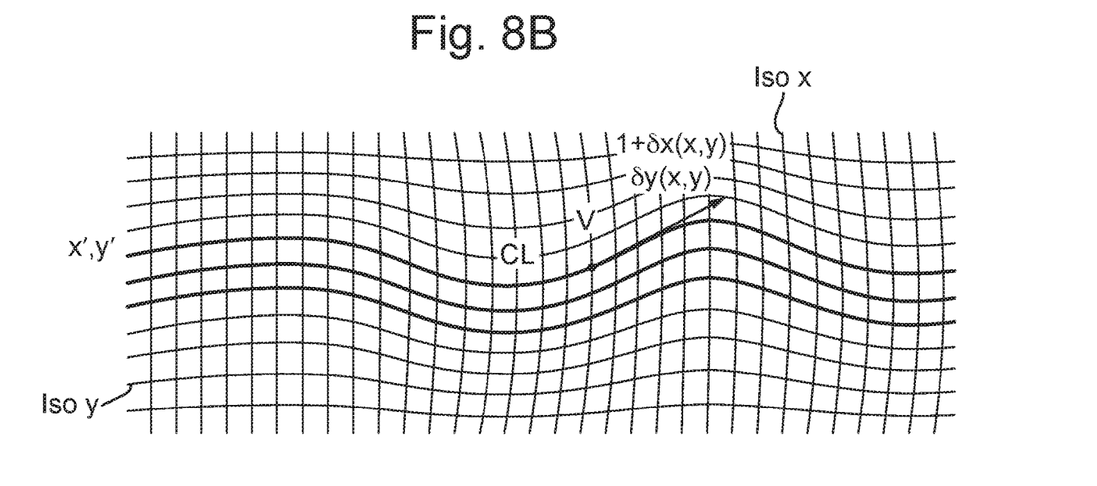
FIG. 8B schematically illustrates coordinates of the actual position of the acquired image of FIG. 8A.

As illustrated in FIGS. 8A and 8B, with $\delta_x(x,y)$ and $\delta_y(x,y)$ the instantaneous displacements in x and y, actual positions x' and y' may be defined such that:

$$x'(x,y)=x+\int_0^x \delta_x(u,y)du \text{ and } y'(x,y)=y+\int_0^x \delta_y(u,y)du \quad \text{(Eq. 4)}$$

The formulas in Eq. 4 describe a mapping between the coordinates of an acquired image (x and y) and an actual position (x' and y'). The mapping may be performed horizontally, line by line, because the instantaneous displacements $\delta_x(x,y)$ and $\delta_y(x,y)$ are calculated between adjacent rows. FIGS. 8A and 8B schematically represent geometrically the formulas of Eq. 4. FIG. 8A schematically illustrates coordinates of the acquired image. FIG. 8B schematically illustrates coordinates of the actual position of the acquired image of FIG. 8A. In FIGS. 8A and 8B, the matrix movement moved the grey levels from (x',y') to (x,y).

In FIGS. 8A and 8B, a horizontal straight line is transformed in a curvilinear line CL which is also a function of x. As illustrated in FIG. 8B, the components of a tangent vector V to the curvilinear line CL are $(1+\delta_x(x,y), \delta_y(x,y))$. It is noted that x and y are not symmetrical, because the displacements are not real functions of x and y, but functions of time t and y. However time t may be replaced by x, because time t and x are in a proportional relationship. In $(1+\delta_x(x,y))$, 1 comes from the time flow.

In Equation 4 above, the lower limit of the integral (sum) is zero, but it should be understood that the lower limit could be any value, xo, i.e. from an X ray pulse associated with a start of the scan of the cargo. In such a case the equations are:

$$x'(x,y)=x+\int_{x_0}^x \delta_x(u,y)du \text{ and } y'(x,y)=y+\int_{x_0}^x \delta_y(u,y)du$$

In Equation 4 above, the upper limit of the integral (sum) may be associated with the row which may be chosen as a reference. The total displacement of each point of the image from its position without any displacement needs to be determined. It is thus assumed that the reference row may correspond to a rest position of the matrix. The reference row may be associated with an X ray pulse associated with an end of the scan of the cargo.

Most of the theoretical developments above have been made with continuous models. The more practical discrete equivalent of equations will be (with the first column as reference):

$$x'_{ij} = x_{ij} + \sum_{i'=1}^{i'=i} (\delta_x)_{i'j} \text{ and}$$

$$y'_{ij} = y_{ij} + \sum_{i'=1}^{i'=i} (\delta_y)_{i'j}$$

$X_{ij}$ and $y_{ij}$ are integers (because i and j are pixel coordinates) while $x_{ij}', y_{ij}'$ are not integers (in a general case, the parasitic displacement in space of a detector is not a multiple of the row width).

Figure 9:
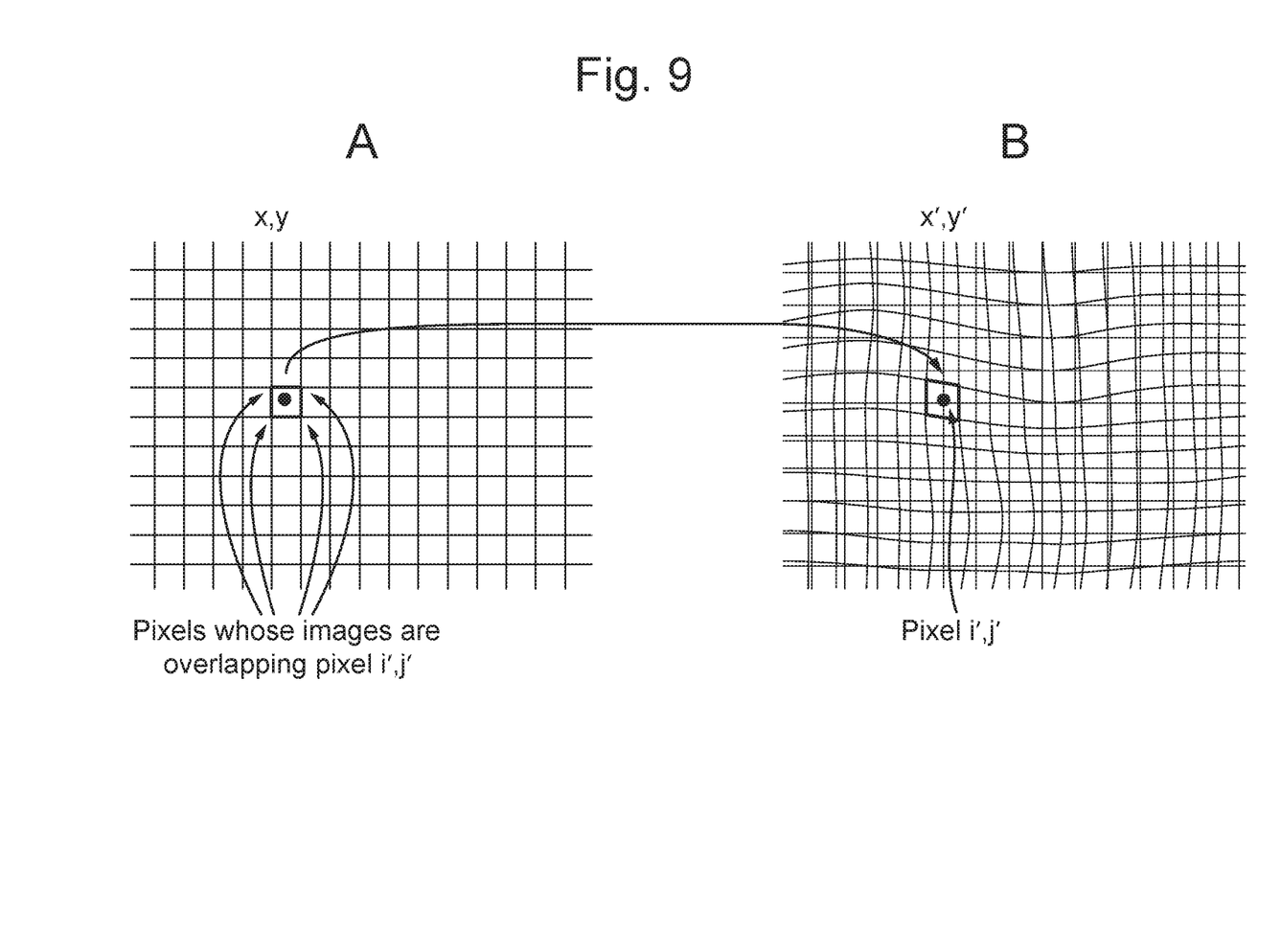
FIGS. 9A and 9B schematically illustrate how, for a given pixel (i',j'), the pixels (i,j) whose images by the distortion are overlapping (i',j') may be determined.

In some examples, grey levels for integer paired values of x' and y' are determined because they correspond to a coordinate of a pixel. There are several numerical ways to determine grey levels for integer paired values of x' and y', e.g. using morphing. The principle is schematically illustrated in FIGS. 9A and 9B where there is shown reverse mapping. In FIGS. 9A and 9B, for a given pixel (i',j'), the pixels (i,j) whose images by the distortion are overlapping (i',j') may be determined. The grey level in (i',j') may be calculated by a sum of the grey levels of the pixels (i,j), weighted by the overlapping ratio.

In the simplest case where matrix movements can be approximated by a vertical translation ($\delta_x=0$ and $\delta_y$ only depending on x):

$$x_{ij}'=i \text{ and } y_{ij}'=j+\sum_{i'=1}^{i'=i}(\delta_y)_{i'} \quad \text{(Eq. 5)+}$$

As illustrated in FIG. 1, the method 100 may also include generating, at S5, a corrected image of the cargo 11, based on at least one of the first image and the at least one second image and on the determined total mutual parasitic displacement.

In some examples, calculating the corrected image may be performed by translating each column of a quantity D equal to:

$$D=-\sum_{i'=1}^{i'=i}(\delta_y)_{i'}.$$

As explained above, the result for D above corrects boom movements which are mainly vertical translation movements (e.g. effects of rotation are considered very small)

In a general case in x and y:

$$D_x(x,y) = \sum_{x'=1}^{x'=x} \Delta_x(x', y)$$

$$D_y(x,y) = \sum_{x'=1}^{x'=x} \Delta_y(x', y)$$

Therefore the p images may be corrected following the equations:

$$I_n(x,y)=I_n(x-Dx(x,y),y-Dy(x,y))$$

with $I_n(x,y)$ being the corrected nth image.

The last calculation may not be performed for all of the images, as the corrected images may be assumed to be the similar.

As explained in further detail below in relation to FIG. 2, the inspection system 10 is configured to inspect the cargo 11. In some non-limiting examples, the inspection may be performed by transmission of inspection radiation 13 from an inspection radiation source 15 to the matrix 12 through the cargo 11.

In the example illustrated by FIG. 2, the system 10 may further include a controller 16, configured to communicate, via a communication network which may be wired and/or may be wireless, with the matrix 12 to generate one or more images from data received from the matrix 12. The controller 16 includes at least a processor and a memory in order to perform, at least partly, an example method 100 according to the disclosure, e.g. locally on the system 10.

In the example illustrated by FIG. 2, the system 10 may further include an analyser 17 configured to receive one or more images from the controller 16, for example over a communication network which may be wired and/or may be wireless. The analyser 17 includes at least a processor and a memory in order to perform, at least partly, an example method 100 according to the disclosure, e.g. remotely from the system 10.

In some examples, determining at S3 the local mutual parasitic displacement may include using at least one of: an image cross-correlation technique and an energy minimization technique.

Cross-correlation of images is known to the man skilled in the art for determining the displacement field in a sequence of images. The cross-correlation technique will now be briefly described.

A Fourier transform may be used to find the displacement vector locally. If $I_p$ and $I_q$ are two images corresponding to rows p and q, $F_p$ and $F_q$ may be the 2D Fourier transforms.

A normalized cross power spectrum R may be calculated such that:

$$R = \frac{F_q \circ F_p^*}{|F_q \circ F_p^*|}$$

with ° is the entry-wise product and * is the complex conjugate.

If $I_q$ and $I_p$ are the same image shifted by $(\delta_x, \delta_y)$, the cross power spectrum is:

$$R(u,y) = \frac{F_q F_q^*}{|F_q F_q^*|}(u,v) \cdot e^{2i\pi(u\cdot\delta_x + v\cdot\delta_y)} = e^{2i\pi(u\cdot\delta_x + v\cdot\delta_y)} \quad \text{(Eq. 6)}$$

In order to get the cross-correlation, the inverse Fourier transform of the cross power spectrum which is now a Dirac delta function localized in $(\delta_x, \delta_y)$ may be determined. Finding $(\delta_x, \delta_y)$ may require calculation of R, and the maximum of the Fourier transform of R may be localized.

For determining a displacement field, the above method may be applied for each pixel (x,y) on a small square window (n×n pixels) centered on the pixel, and the result may be considered as the local displacement $(\delta_x(x,y), \delta_y(x,y))$. The obtained local displacement may be divided by (q-p) to get the local instantaneous displacement.

Energy minimization is also known to the man skilled in the art. The energy minimization technique will now be briefly described.

A convex or pseudo-convex function with the instantaneous displacement vectors as variables is built, and the minimum of the function is determined. The usual basic term of such a function is a "conformity term". Always considering $I_p$ and $I_q$ (p>q) as above, this first basic term is such that:

$$E_C((\delta_x)_{ij},(\delta_y)_{ij})=\Sigma_{ij}(I_p(i-(p-q)\cdot(\delta_x)_{ij}, j-(p-q)\cdot(\delta_y)_{ij})-I_q(x,y))^2 \quad \text{(Eq. 7)}$$

For the sake of clarity, the discrete form of the function has been used in Eq. 7. The "conformity term" above may be the square of the difference between a shifted image (term $I_p$) and a target image (term $I_q$). The algorithm consists in determining the values of $(\delta_x)_{ij}$ and $(\delta_y)_{ij}$ which minimize $E_c$. The determined values correspond to values of displacements which make image $I_p$ look as similar as possible as image $I_q$.

Other terms of regularization may be added to Eq. 7 in order to stabilize obtained results:

$$E_T((\delta_x)_{ij},(\delta_y)_{ij})=E_c((\delta_x)_{ij},(\delta_y)_{ij})+\alpha(\Sigma_{ij}(\nabla^2(\delta_x)_{ij}+\Sigma_{ij}(\nabla^2(\delta_y)_{ij})) \quad \text{(Eq. 8)}$$

Here the gradients are calculated as difference of $\delta_x$ and $\delta_y$ between two adjacent pixels. The coefficient α (positive) expresses the balance between the two terms of $E_T$. The higher α, the smoother the transformation. The displacements to be determined are not integers, and warping/interpolating algorithms may be used to compute the term $E_c$.

With the constant speed assumption as mentioned above, a function integrating all possible pairs of images may be such that:

$$E_T((\delta_x)_{ij}, (\delta_y)_{ij}) = \quad \text{(Eq.9)}$$

$$\sum_{\substack{n,p \\ p>n}} E_C(n, p, (\delta_x)_{ij}, (\delta_y)_{ij}) + \alpha\left(\sum_{ij}\left(\nabla^2(\delta_x)_{ij} + \sum_{ij}\left(\nabla^2(\delta_y)_{ij}\right)\right)\right)$$

with $E_C(n, p, (\delta_x)_{ij}, (\delta_y)_{ij}) =$ $$\sum_{ij}(I_p(i-(p-n)\cdot(\delta_x)_{ij}, j-(p-n)\cdot(\delta_y)_{ij}) - I_q(x,y))^2$$

Gradient descent techniques may be used to minimize $E_T$.

In the examples illustrated in FIG. 2, the inspection radiation source 15 may include an X-ray generator. The energy of the X-rays may be between 100 keV and 15 MeV, and the dose rate may be between 2 mGy and 20 Gy (Gray) per minute at one meter from the source. In the example illustrated by FIG. 2, the maximum X-ray energy of the X-ray source 15 may be e.g., between 100 keV and 9.0 MeV, typically e.g., 2 MeV, 3.5 MeV, 4 MeV, or 6 MeV, for a steel penetration capacity e.g., between 40 mm to 400 mm, typically e.g., 300 mm (12 in). In the example illustrated by FIG. 2, the dose may be e.g., between 20 mGy and 120 mGy. In other examples, the maximum x-ray energy of the X-ray source 15 may be e.g., between 4 MeV and 10 MeV, typically e.g., 9 MeV, for a steel penetration capacity e.g., between 300 mm to 450 mm, typically e.g., 410 mm (16.1 in). In some examples, the dose may be 17 Gy.

The system 10 may further include other types of detectors, such as optional gamma and/or neutrons detectors, e.g., adapted to detect the presence of radioactive gamma and/or neutrons emitting materials within the cargo 11, e.g., simultaneously to the X-ray inspection.

The invention claimed is:

1. A method for inspecting cargo with X-rays, the method comprising:
   scanning the cargo with a matrix comprising at least two rows of detectors by:
      mutually displacing the cargo and the matrix with a mutual scanning displacement, and
      detecting, with the matrix, radiation generated by a plurality of successive X ray pulses irradiating the cargo, during the mutual scanning displacement,
      wherein each zone of the cargo irradiated by a first X ray pulse is irradiated by at least one second X ray pulse, and
      wherein a radiation corresponding to the first X ray pulse is detected by a first row of the matrix, and a radiation corresponding to the at least one second pulse is detected by at least one second row of the matrix;
   generating a first image of the cargo for a first row of the matrix and at least one second image of the cargo for at least one second row of the matrix,
      wherein each image comprises pixels corresponding to the row of detectors for each X ray pulse;
   determining, for each zone of the cargo irradiated by the first X ray pulse and by the at least one second X ray pulse, at least one local mutual parasitic displacement between the cargo and the matrix by determining local mutual displacements between corresponding pixels of the first image and the at least one second image, the local mutual parasitic displacement:
      occurring between the first pulse and the at least one second X ray pulse, and
      being other than the mutual scanning displacement occurring between the first pulse and at least one second pulse;
   determining at least one total mutual parasitic displacement, by summing the determined local mutual displacements for the irradiated zones, from an X ray pulse associated with a start of the scan of the cargo to an X ray pulse associated with an end of the scan of the cargo; and
   generating at least one corrected image of the cargo, based on at least one of the first image and the at least one second image and on the determined at least one total mutual parasitic displacement.

2. The method of claim 1, wherein scanning the cargo comprises scanning the cargo in a mobile mode, and mutually displacing the cargo and the matrix comprises:
   maintaining the cargo static with respect to a ground and displacing the matrix with respect to the ground during the scanning displacement.

3. The method of claim 1, wherein scanning the cargo comprises mounting the matrix on a boom of a mobile inspection system.

4. The method of claim 2, wherein generating the corrected image comprises:
   correcting boom movements artefacts generated in the mobile mode.

5. The method of claim 1, wherein scanning the cargo comprises scanning the cargo in a pass-through mode, and mutually displacing the cargo and the matrix comprises:
   maintaining the matrix static with respect to a ground and displacing the cargo with respect to the ground during the scanning displacement.

6. The method of claim 1, wherein scanning the cargo comprises mounting the matrix on a boom of a static inspection system.

7. The method of claim 5, wherein generating the corrected image comprises:
   correcting cargo speed inhomogeneity generated in the pass-through mode.

8. The method of claim 1, wherein determining the local mutual parasitic displacement comprises:
   using at least one of an image cross correlation technique and an energy minimization technique.

9. The method of claim 1, wherein generating the at least one corrected image, at pixel (x, y), comprises:
   translating each pixel (x, y) of quantities −Dx and −Dy corresponding to total mutual parasitic displacements such that:

$$D_x(x, y) = \sum_{x'=1}^{x'=x} \Delta_x(x', y)$$

$$D_y(x, y) = \Sigma_{x'=1}^{x'=x} \Delta_y(x', y);$$

with Δx(x,y) and Δy(x,y) the local parasitic displacements in an horizontal scanning direction (Ox) and a vertical direction (Oy).

10. The method of claim 9, comprising determining a displacement field between two images Ip(x,y) and Iq(x,y), corresponding to a row p and a row q of the matrix, such that:

$$\Delta x((p-q),y)=[\Delta px(x,y)-\Delta qx(x,y)]/(p-q)$$

$$\Delta y((p-q),y)=[\Delta py(x,y)-\Delta qy(x,y)]/(p-q).$$

11. The method of claim 9, wherein, in a case where the main parasitic movements are vertical translation movements, −Dx=0 and −Dy=−D such that:

$$D = -\sum_{i'=1}^{i'=i} (\delta_y)_{i'};$$

with δy=Δy(x,y), with Δy(x,y) only depending on x.

12. The method of claim 9, wherein generating the at least one corrected image comprises generating the corrected nth image $I_{cn}(x,y)$ such that:

$$I_{cn}(x,y)=I_n(x-Dx(x,y),y-Dy(x,y)).$$

13. The method of claim 12, wherein generating the corrected nth image comprises generating only one subset of corrected images equal to or smaller than the number of rows of the matrix.

14. An apparatus comprising:
a processor; and
a memory,
wherein the memory comprises instructions which, when executed by the processor, enable the processor to perform the method according to claim 1.

15. A computer program or a computer program product, comprising instructions embodied on a non-transitory computer-readable medium, wherein the instructions, when executed by a processor, enable the processor to perform a method according to claim 1.

16. The method of claim 2, wherein scanning the cargo comprises mounting the matrix on a boom of a mobile inspection system.

17. The method of claim 3, wherein generating the corrected image comprises:
correcting boom movements artefacts generated in the mobile mode.

18. The method of claim 2, wherein scanning the cargo comprises mounting the matrix on a boom of a static inspection system.

19. The method of claim 3, wherein scanning the cargo comprises mounting the matrix on a boom of a static inspection system.

20. The method of claim 4, wherein scanning the cargo comprises mounting the matrix on a boom of a static inspection system.

\* \* \* \* \*